United States Patent
Bai et al.

(10) Patent No.: US 12,312,505 B2
(45) Date of Patent: May 27, 2025

(54) ADHESIVE COMPOSITION

(71) Applicants: Dow Global Technologies LLC, Midland, MI (US); Rohm and Haas Company, Collegeville, PA (US)

(72) Inventors: ChenYan Bai, Shanghai (CN); Yin Xue, Shanghai (CN); Jianliang Zhu, Shanghai (CN); Lei Ying, Shanghai (CN); Xinhong Wang, Shanghai (CN)

(73) Assignee: Arkema France, Puteaux (FR)

( * ) Notice: Subject to any disclaimer, the term of this patent is extended or adjusted under 35 U.S.C. 154(b) by 274 days.

(21) Appl. No.: 17/754,574

(22) PCT Filed: Oct. 31, 2019

(86) PCT No.: PCT/CN2019/114657
§ 371 (c)(1),
(2) Date: Apr. 6, 2022

(87) PCT Pub. No.: WO2021/081879
PCT Pub. Date: May 6, 2021

(65) Prior Publication Data
US 2023/0340311 A1      Oct. 26, 2023

(51) Int. Cl.
*C09J 175/06*    (2006.01)
*B65D 33/25*     (2006.01)
*C09J 175/08*    (2006.01)

(52) U.S. Cl.
CPC ........ *C09J 175/06* (2013.01); *B65D 33/2508* (2013.01); *C09J 175/08* (2013.01)

(58) Field of Classification Search
CPC ...... C09J 175/06; C09J 175/08; C09J 133/08; B65D 33/2508; C08F 220/1804; C08F 212/08; C08F 220/06; C08G 18/0823; C08G 18/0866; C08G 18/12; C08G 18/348; C08G 18/4277; C08G 18/4808; C08G 18/6659; C08G 18/755; C08G 18/7621; C08G 18/10; C08G 18/4018; C08G 18/4202; C08G 18/44; C08G 18/4825; C08G 18/6692; C08G 18/758; C08G 18/7671; C08G 18/3228; C08G 18/322; C08G 18/48; C08L 75/04; C08L 75/08
See application file for complete search history.

(56) References Cited

U.S. PATENT DOCUMENTS

| | | | |
|---|---|---|---|
| 5,965,646 A | 10/1999 | Norby | |
| 6,303,189 B1 | 10/2001 | Gray et al. | |
| 7,220,338 B2 | 5/2007 | Chen et al. | |
| 9,988,533 B2 | 6/2018 | Billiani et al. | |
| 2003/0050347 A1* | 3/2003 | Faust | C08G 18/12 516/38 |
| 2007/0155892 A1* | 7/2007 | Gharapetian | C09D 15/00 524/556 |
| 2019/0010362 A1* | 1/2019 | Lin | C09J 5/06 |

FOREIGN PATENT DOCUMENTS

| | | |
|---|---|---|
| CN | 103097482 A | 5/2013 |
| CN | 103602296 A | 2/2014 |
| CN | 107858124 A | 3/2018 |
| CN | 109320946 A | 2/2019 |
| CN | 109749046 A | 5/2019 |
| JP | H09-328669 A | 12/1997 |
| JP | H9328669 A | 12/1997 |
| JP | 2001247835 A * | 9/2001 |
| JP | 2002235062 A | 8/2002 |
| JP | 2007-154168 A | 6/2007 |
| JP | 2007-169382 A | 7/2007 |
| JP | 2016088598 A * | 5/2016 |
| JP | 2017-531062 A | 10/2017 |
| JP | 2018-168385 A | 11/2018 |

OTHER PUBLICATIONS

JP2001247835A Machine Translation of Description (Year: 2024).*
JP2016088598 Machine Translation of Description (Year: 2024).*
PCT/CN2019/114657, International Search Report and Written Opinion with a mailing date of Jul. 31, 2020.
PCT/CN2019/114657, International Preliminary Report on Patentability with a mailing date of May 3, 2022.

* cited by examiner

*Primary Examiner* — Cynthia L Schaller
(74) *Attorney, Agent, or Firm* — Boyle Fredrickson S.C.

(57) ABSTRACT

An adhesive composition is provided. The adhesive composition for zipper bag application, comprising the following components: (a) a mixture of a polyurethane dispersion with acrylic emulsion, wherein the polyurethane dispersion comprises a reaction product of by dry weight based on total dry weight of the polyurethane dispersion, from 30% to 50% of a monomeric diisocyanate, from 45% to 69% of a polymeric polyol and from 1% to 15% of ionic surfactant, the polyurethane dispersion has a Tg of −15° C. to 15° C., and the acrylic emulsion has a Tg of −10° C. to 25° C., and wherein the ratio by weight of the polyurethane dispersion and the acrylic emulsion is from 15:85 to 85:15, (b) a polyisocyanate.

9 Claims, No Drawings

ADHESIVE COMPOSITION

FIELD OF THE INVENTION

The present disclosure relates to an adhesive composition, in particular to an adhesive composition comprising a polyurethane dispersion and a polyacrylate emulsion.

BACKGROUND

Waterborne ("WB") adhesive was always used for flexible packaging, but WB adhesive was only used for general performance application. There is a need to apply WB adhesive to medium performance application, like zipper bag application. Zipper bag application can only be used either solventless ("SL") or solvent based ("SB") adhesive now, and no WB adhesive can meet the requirement for the zipper bag application.

Generally, the method for producing a zipper bag involves the step of melting the zipper at about 210° C., such that the adhesive composition should withstand this high temperature. A conventional WB adhesive cannot withstand such high temperature, so the zipper area will form tunnels.

There is a need to provide a WB adhesive composition for zipper bag application which will not have the problem of tunnels.

SUMMARY OF THE INVENTION

The present disclosure provides an adhesive composition for zipper bag application, which can withstand the high temperature for producing the zipper bag, thereby solving the problem of tunnels in the zipper area.

In a first aspect of the present disclosure, the present disclosure provides an adhesive composition for zipper bag application, comprising the following components:
  (a) a mixture of a polyurethane dispersion with acrylic emulsion,
  wherein the polyurethane dispersion comprises a reaction product of by dry weight based on total dry weight of the polyurethane dispersion, from 30% to 50% of a monomeric diisocyanate, from 45% to 69% of a polymeric polyol and from 1% to 15% of ionic surfactant, the polyurethane dispersion has a Tg of −15° C. to 15° C., and the acrylic emulsion has a Tg of −10° C. to 25° C., and wherein the ratio by weight of the polyurethane dispersion and the acrylic emulsion is from 15:85 to 85:15,
  (b) a polyisocyanate.

In a second aspect of the present disclosure, the present disclosure provides a method of producing a zipper bag, comprising:
  (a) providing a film substrate;
  (b) providing an adhesive composition;
  (c) applying the adhesive composition to the substrate to form a laminate;
  (d) curing the laminate; and
  (e) making a pouch bag with the laminate and inserting a zipper to form zipper bag.

In a third aspect of the present disclosure, the present disclosure provides a zipper bag prepared by the method according to the present disclosure.

In a fourth aspect of the present disclosure, the present disclosure provides usage of the adhesive composition of the present disclosure for a zipper bag application.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

As disclosed herein, the term "composition", "formulation" or "mixture" refers to a physical blend of different components, which is obtained by mixing simply different components by a physical means.

As disclosed herein, the term "glass transition temperature" or "Tg" is determined by differential scanning calorimetry (DSC).

As disclosed herein, the term "zipper bag" means a bag having zipper, in which the bag can be opened or closed by the zipper. The bag may be prepared by any material, such as a polymer and paper. The zipper is made by a material such as a plastic (including polyethylene or polypropylene material), which can be adhered to the bag at a high temperature by melting method.

As disclosed herein, the "zipper" refers to a device which can be opened and closed many times. For example, the term "zipper" comprises a zipper, engaged-type sealing mechanism and the like.

As disclosed herein, all percentages mentioned herein are by weight, and temperatures in ° C., unless specified otherwise.

As used herein, the term "(meth)acrylate" refers to acrylate or methacrylate.

As used herein, the term "acrylic monomer" means acrylonitrile (AN); acrylamide (AM) and its N-substituted derivatives; acrylic acid (AA), methacrylic acid (MAA), and their esters; and itaconic acid (IA). Esters of AA and MAA include, but are not limited to, methyl methacrylate (MMA), ethyl methacrylate (EMA), butyl methacrylate (BMA), ethylhexyl methacrylate (EHMA), lauryl methacrylate (LMA), hydroxyethyl methacrylate (HEMA), methyl acrylate (MA), ethyl acrylate (EA), butyl acrylate (BA), isobutyl acrylate (IBA), ethylhexyl acrylate (EHA) and hydroxyethyl acrylate (HEA), as well as other esters of AA or MAA.

As used herein, the term "styrene monomer" means an ethylenically unsaturated monomer substituted with an aromatic group, preferably styrene (Sty) and substituted styrenes, e.g., α-methylstyrene (AMS).

As used herein, the term "emulsion", "latex" or "latex composition" refers to a dispersion of a water-insoluble polymer which may be prepared by conventional polymerization techniques such as, for example, by emulsion polymerization.

In a first aspect of the present disclosure, the present disclosure provides an adhesive composition for zipper bag application, comprising the following components:
  (a) a mixture of a polyurethane dispersion with acrylic emulsion,
    wherein the polyurethane dispersion comprises a reaction product of by dry weight based on total dry weight of the polyurethane dispersion, from 30% to 50% of a monomeric diisocyanate, from 45% to 69% of a polymeric polyol and from 1% to 15% of ionic surfactant, the polyurethane dispersion has a Tg of −15° C. to 15° C., and the acrylic emulsion has a Tg of −10° C. to 25° C., and wherein the ratio by weight of the polyurethane dispersion and the acrylic emulsion is from 15:85 to 85:15, (b) a polyisocyanate.

The adhesive composition is aqueous, and is preferably solvent free, that is, the adhesive composition comprises less than 4%, preferably less than 2%, and more preferably less than 1%, by dry weight based on total dry weight of the adhesive composition, an organic solvent.

The Polyurethane Dispersion

The polyurethane dispersion comprises a reaction product (e.g., a polyurethane prepolymer) of by dry weight based on total dry weight of the polyurethane dispersion, from 30% to 50%, preferably from 35% to 45%, more preferably from 37% to 42% of a monomeric diisocyanate, from 45% to 69%, preferably from 50% to 65%, more preferably from 54% to 60% of a polymeric polyol and from 1% to 15%, preferably from 1.5% to 10%, more preferably from 2% to 8% of ionic surfactant.

The monomeric diisocyanates preferably have a molecular weight Mw of less than 500 g/mol, preferably less than 300 g/mol, and more preferably less than 275 g/mol.

The preferred monomeric diisocyanates can be aliphatic diisocyanate, cycloaliphatic diisocyanate, aromatic diisocyanate, heteroaromatic diisocyanate, or any combinations thereof. The preferred aliphatic diisocyanates include but are not limited to, for example, isophorone diisocyanate (IPDI), methylene-bis-(4-cyclohexylisocyanate) (HMDI), and hexamethylene diisocyanate (HDI). The preferred aromatic diisocyanate are selected from methylene diphenyl diisocyanate (MDI), toluene diisocyanate (TDI), and the combination thereof. TDI can be generally used with any commonly available isomer distributions. The most commonly available TDI has an isomer distribution of 80%2,4-isomer and 20%2,6-isomer. TDI with other isomer distributions can also be used. When MDI is used in the preparation of the polyurethane prepolymer, it is preferably pure 4,4'-MDI or any combinations of MDI isomers. More preferably, it is pure 4,4'-MDI, and any combinations of 4,4'-MDI with other MDI isomers. When the combinations of 4,4'-MDI with other MDI isomers are used, the preferred concentration of 4,4'-MDI is from 250% to 75% of all MDI isomers.

The polymeric polyol comprises a polyether polyol, a polyester polyol, a polycarbonate polyol, an acrylic polyol, a polybutadiene polyol, a polysiloxane polyol, and any other suitable polymeric polyol. The polymeric polyol (including the polyether polyol and the polyester polyol) has a molecular weight Mw of from 400 to 4000 g/mol, preferably from 750 to 3500 g/mol, and more preferably from 800 to 3000 g/mol. The polymeric polyol (including the polyether polyol and the polyester polyol) has a functionality of from 1.8 to 4, preferably from 1.9 to 3, and more preferably from 2 to 2.5.

Polyether polyols are the addition polymerization products and the graft products of ethylene oxide, propylene oxide, tetrahydrofuran, and butylene oxide, the condensation products of polyhydric alcohols, and any combinations thereof. Suitable examples of the polyether polyols include polypropylene glycol (PPG), polyethylene glycol (PEG), polybutylene glycol, polytetramethylene ether glycol (PTMEG), and any combinations thereof. Preferably, the polyether polyols are the combinations of PEG and at least one another polyether polyol selected from the above described addition polymerization and graft products, and the condensation products. More preferably, the polyether polyols are the combinations of PEG and at least one of PPG, polybutylene glycol, and PTMEG.

The polyester polyols are the condensation products or their derivatives of diols, and dicarboxylic acids and their derivatives.

Suitable examples of the diols are ethylene glycol, butylene glycol, diethylene glycol, triethylene glycol, polyalkylene glycols such as polyethylene glycol, 1,2-propanediol, 1,3-propanediol, 2-methyl-1,3-propandiol, 1,3-butanediol, 1,4-butanediol, 1,6-hexanediol, neopentyl glycol, 3-methyl-1,5-pentandiol, and any combinations thereof. In order to achieve a polyol functionality of greater than triols and/or tetraols may also be used. Suitable examples of such triols include trimethylolpropane and glycerol. Suitable examples of such tetraols include erythritol and pentaerythritol.

Dicarboxylic acids are selected from aromatic acids, aliphatic acids, and the combination thereof. Suitable examples of the aromatic acids are phthalic acid, isophthalic acid, and terephthalic acid; while suitable examples of the aliphatic acids are adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, and 2,2-dimethyl succinic acid. Anhydrides of these acids can likewise be used. For the purposes of the present invention, the anhydrides are accordingly encompassed by the expression of term "acid". Preferably, the aliphatic acids and aromatic acids are saturated, and are respectively adipic acid and isophthalic acid. Monocarboxylic acids, such as benzoic acid and hexane carboxylic acid, should be minimized or excluded.

Polyester polyols can be also prepared by addition polymerization of lactone with diols, triols and/or tetraols. Suitable examples of lactone include caprolactone, butyrolactone and valerolactone. Suitable examples of the diols are ethylene glycol, butylene glycol, diethylene glycol, triethylene glycol, polyalkylene glycols such as polyethylene glycol, 1,2-propanediol, 1,3-propanediol, 2-methyl 1,3-propandiol, 1,3-butanediol, 1,4-butanediol, 1,6-hexanediol, neopentyl glycol, 3-methyl 1,5-pentandiol and any combinations thereof. Suitable examples of triols include trimethylolpropane and glycerol. Suitable examples of tetraols include erythritol and pentaerythritol.

The polycarbonate polyols may comprise repeating units from one or more alkane diols having 2 to 50 carbon atoms. The polycarbonate polyols may have a number average molecular weight from about 500 to about 5,000, preferably, from about 500 to about 3,000, more preferably, from about 1,000 to about 2,500. The one or more polycarbonate polyols may have a hydroxyl number average from about 22 to about 220 mg KOH/g, for example, from about 45 to 150 mg KOH/g.

The preparation of the polyurethane prepolymer is in any way well-known to those of ordinary skills in the art, and includes condensation polymerization. The polyurethane prepolymer is preferably an NCO group terminated prepolymer. Organic solvent is preferably not used in the preparation of the polyurethane prepolymer.

In the practice of preparing the polyurethane dispersion of the present invention, the ionic surfactant is preferably introduced into the polyurethane prepolymer prior to the addition of water, but it is not outside the scope of the present invention that the surfactant is charged into water prior to the addition of the polyurethane prepolymer.

The ionic surfactant is preferably anionic, including internal anionic surfactants and external anionic surfactants. Suitable examples of the internal surfactants include 2,2-dimethylol propionic acid and its derivatives. Suitable examples of the external surfactants include sulfonates, phosphates, carboxylates, and any combinations thereof. Preferably, the external surfactant is sulfonate such as sodium dodecyl benzene sulfonate, sodium dodecyl sulfonate, sodium dodecyl diphenyl oxide disulfonate, sodium n-decyl diphenyl oxide disulfonate, isopropylamine dodecylbenzenesulfonate, and sodium hexyl diphenyl oxide disulfonate. More preferably, the external surfactant is sodium dodecyl benzene sulfonate.

The polyurethane dispersion preferably has a solid content of from 25% to 60%, preferably from 30% to 55%, and more preferably from 35% to 50%.

Generally, the polyurethane dispersion has a Tg of −15° C. to 15° C., preferably −10° C. to 15° C., more preferably −5° C. to 15° C., even more preferably −5° C. to 5° C.

The Acrylic Emulsion

The acrylic emulsion is a latex, which is a water-based dispersion of particles of a polymer of unsaturated acrylic monomers. Other than acrylic and styrene monomers, suitable monomers might include, for example, vinyls (e.g., acetates, such as vinyl acetate, ethylene vinyl acetate; alcohols; chlorides such as polyvinyldichloride, polyvinyl chloride; or the like). The latex will typically exhibit a viscosity ranging from about 10 to 1000 cps and more preferably from 20 to 500 cps at 25° C. The solids content in the latex may range from 5 to 95%. More preferably it ranges from 20 to 80%, still more preferably from 30 to 70%, and even still more preferably it ranges from 40 to 60%. In one embodiment, the polymer of the latex has a weight average molecular weight of between 5000 and 2,000,000 and more preferably between 100,000 and 2,000,000.

The polymer has from 35-50% residues of at least one styrene monomer, preferably no more than 46%. In one embodiment of the present disclosure, the polymer has from 35-46% residues of at least one styrene monomer, preferably styrene. The polymer has from 40-80% residues of at least one acrylic monomer. Preferably, the polymer has from 50-70% residues of at least one C4-C12 alkyl acrylate ester monomer. In one preferred embodiment, the C4-C12 alkyl acrylate ester monomer(s) is BA, EHA, IBA, LMA, or combinations thereof.

The polymer has from 1-5% residues of (meth)acrylic acid. Preferably, the polymer has from 1-4% residues of (meth)acrylic acid, and most preferably from 1.5-3%. Preferably, the (meth)acrylic acid residues in the polymer are residues of acrylic acid.

The polymer has less than 0.5% residues of hydroxyl-containing monomers. Preferably, the polymer has less than 0.3% of such residues, more preferably less than 0.2%, and most preferably the polymer is substantially free of residues of hydroxyl-containing monomers. Examples of hydroxyl-containing monomers include, e.g., HEMA, HEA, vinyl alcohol, hydroxypropyl methacrylate (HPMA) and hydroxypropyl acrylate. Preferably, the polymer is substantially free of amino-containing monomers. Preferably, the polymer has less than 0.5% of isocyanate-reactive groups other than carboxylic acid groups, more preferably less than 0.2%, and most preferably, the polymer is substantially free of isocyanate-reactive groups other than carboxylic acid groups.

The latex is mixed with a water dispersible polyol to provide hydroxyl functionality. A water dispersible polyol is one which will form a solution or emulsion in water at room temperature with agitation at any amount in the range 1-50%. The polyol may be a polyether polyol, a polyester polyol, polyester polyether polyol or a mixture thereof. A polyol will have multiple hydroxyl functionality and thus will contain at least two hydroxyl groups. Preferred polyols are selected from diols, triols or mixtures thereof. The polyol is sufficiently nonvolatile that it will be fully or at least partially available for reaction with the isocyanate during mixing operations. The polyol also is water soluble or water dispersible. Preferably the polyol will have a number average molecular weight from 100 to 7500, more preferably 150 to 5000, and still more preferably from 200 to 1000. In one embodiment, the molecular weight is less than 1500 and still more preferably less than 600. An example of a highly preferred polyol is polypropylene glycol (PPG), such as 400 MW polypropylene glycol. The polyol is provided in an amount of from 0.1-10% of the solid portion of the first component. Preferably the amount of polyol is no more than 5%, more preferably no more than 3%, still more preferably no more than 2%, and most preferably no more than 1.5%. Preferably, the amount of polyol is at least 0.3%, more preferably at least 0.4%, and most preferably at least 0.6%. The solid portion of a component is the non-volatile portion, typically comprising polymers and other non-volatile additives, e.g., surfactants, pigments, flame retardants; and excluding water and other solvents.

It will be appreciated that surfactants may be employed as desired in the bonding agent composition of the present invention (e.g., for use in emulsion or dispersion polymerization) to provide stability, as well as to control particle size. Conventional surfactants include anionic or nonionic emulsifiers or their combination. Typical anionic emulsifiers include, but are not limited to alkali or ammonium alkyl sulfates, alkali or ammonium alkylether sulfates, alkali or ammonium alkylarylether sulfates, alkyl sulfonates, salts of fatty acids, esters of sulfosuccinic acid salts, alkyl diphenylether disulfonates, and salts or free acids of complex organic phosphate esters. Typical nonionic emulsifiers include, but are not limited to polyethers, e.g. ethylene oxide and propylene oxide condensates which include straight and branched chain alkyl and alkylaryl polyethylene glycol and polypropylene glycol ethers and thioethers, alkyl phenoxy-poly(ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides. Surfactants may be employed in the polymer compositions of the present invention at levels of 0.1 to 3 wt. % or greater, based on the total weight of the final composition.

The acrylic emulsion has a Tg of −10° C. to 25° C., preferably −5° C. to 20° C., more preferably 0° C. to 15° C.

The ratio by weight of the polyurethane dispersion and the acrylic emulsion is 15:85 to 85:15, preferably 15:85 to 60:40, more preferably 15:85 to 50:50, most preferably 15:85 to 45:55.

The polyisocyanate component may be any suitable polyisocyanate, but preferably it is an aliphatic polyisocyanate, an aromatic polyisocyanate or a mixture thereof. Preferably, the polyisocyanate is a diisocyanate. Examples of suitable polyisocyanates include those based on toluene diisocyanate (TDI), isophorone diisocyanate (IPDI), hexamethylene diisocyanate (HDI), diphenyl methane diisocyanate (MDI), dicyclohexyl methane diisocyanate (HMDI), isomers thereof or mixtures thereof. Prepolymers of a polyisocyanate and a polyol may also be employed. Aliphatic polyisocyanates are especially preferred. The polyisocyanate is water soluble or dispersible, i.e., it will form a solution or emulsion in water at room temperature with agitation at any amount in the range 1-50%. In one embodiment, the polyisocyanate is the water dispersible aliphatic polyisocyanate which is trimers of monomeric aliphatic diisocyanates selected from 1,6-hexamethylene diisocyanate, 1-isocyanato-3-isocyanatomethyl-3,5,5-trimethyl-cyclohexane, 4,4'-diisocyanato dicyclohexylmethane, di-isocyanatomethyl-cyclohexane, and any combination thereof.

The content of the polyisocyanate is from 1% to 10%, preferably from 1% to 8%, more preferably from 1.5% to 6%, most preferably from 1.5% to 4%, based on the total weight of the mixture of polyurethane with acrylic emulsion.

Other optional components of the adhesive composition of the present disclosure include, but are not limited to, agents selected from co-solvents, coalescing agents, pigments or other colorants, fillers, reinforcement (e.g., fibers), dispersants, wetting agents, waxes, catalysts, blowing agents, anti-foam agent, UV absorbers, flame retardants, adhesion promoters, antioxidants, biocides, coalescing agents, or stabilizers. These optional components (as desired) may be added in any order of addition that does not cause an incompatibility between components. Components that do not dissolve in the aqueous carrier (such as pigments and fillers) can be dispersed in the latex or an aqueous carrier or co-solvent using a mixer (optionally a high shear mixer). The pH of the composition can be adjusted by adding acid or base, with agitation. Examples of base include, but are not limited to ammonia, diethylamine, triethylamine, dimethylethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

In a second aspect of the present disclosure, the present disclosure provides a method of producing a zipper bag, comprising:
(a) providing a film substrate;
(b) providing an adhesive composition;
(c) applying the adhesive composition to the substrate to form a laminate;
(d) curing the laminate; and
(e) making a pouch bag with the laminate and inserting a zipper to form zipper bag.

In one embodiment, the film substrate may be prepared by any suitable material such as plastic and paper. For example, the film substrate may be a laminate of two or more plastic films. In one embodiment, the film substrate may be laminate comprising a PET layer.

In one embodiment, the zipper comprises a zipper, engaged-type sealing mechanism and the like. The zipper may be prepared by any suitable material such as plastic.

In one embodiment, inserting a zipper is carried out at a temperature of at least 160° C., preferably 190° C., more preferably 210° C. Preferably, the temperature is 400 or below, more preferably 300 or below.

In a third aspect of the present disclosure, the present disclosure provides a zipper bag prepared by the method according to the present disclosure.

In a fourth aspect of the present disclosure, the present disclosure provides usage of the adhesive composition of the present disclosure for a zipper bag application.

In one embodiment, the usage refers to the usage of the adhesive composition of the present disclosure in the application which is heated at a temperature of at least 160° C.

EXAMPLES

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

TABLE 1

Raw Material Information

| Sample | Description | Supplier |
| --- | --- | --- |
| Voranate T-80 | Toluene diisocyanate | DOW Chemical |
| Vestanat IPDI | Isophorone diisocyanate | Evonik |
| Desmodur W | Methylene-bis-(4-cyclohexylisocyanate) | Covestro |
| Voranol 1010 | Polyether polyol | DOW Chemical |
| Isonate 50 OP | Diphenyl-methane-diisocyanate | DOW Chemical |
| Bester 648 | Polyester polyol | DOW Chemical |
| Bester 121 | Polyester polyol | DOW Chemical |
| Voranol 2020 | Polyether polyyol | DOW Chemical |
| Voranol PEG1000 | Polyether polyol | DOW Chemical |
| Bester 1044 | Polyester polyol | DOW Chemical |
| Eternacoll UP-100 | Polycarbonate polyol | UBE |
| Rhodacal DS-4 | Sodium dodecylbenzenesulphonate | Solvay |
| Capa 220 | Polycaprolactone polyol | Perstorp |
| Bis-MPA | 2,2-Bis(hydroxymethyl)propionic acid | Perstorp |
| TEA | Triethylamine | Sinoreagent |
| APS | Ammonium persulfate | Sinoreagent |
| EDA | Ethylene diamine | Sinoreagent |
| CR3A | Polyisocyanate | DOW Chemical |
| PPG 425 | Polypropylene glycol | DOW Chemical |
| PRIMAL E-2086 | Acrylic seed | Sinoreagent |
| t-BHP | Tert-butyl hydroperoxide | DOW Chemical |

Example 2: Preparation of Polyurethane Dispersion ("PUDs")

PUD-1:
40 g Voranate T-80 was added to the mixture of 35 g Bester 1044, 20 g Eternacoll UP-100 and 5 g Bis-MPA, then the mixture reacted at 65-90° C. for 4-5 h. Then the prepolymer was transferred into a plastic jar, and TEA was add into plastic jar under high speed (2000-3000 rpm) stirring for 1-3 minutes. 186 g cold DI water (5° C.) was added into plastic jar under high speed stirring to make sure the homogeneous oil-in-water dispersion was achieved, and 13.5 g EDA aqueous solution (20%) was added into the dispersion slowly, with stirring at 1000-1500 rpm for 15-30 minutes. PUD-1 was thus obtained with the Tg value of 3° C.

PUD-2:
42 g Desmodur W was added to the mixture of 28 g Voranol 1010, 28 g Eternacoll UP-100 and 3 g Bis-MPA. Then the mixture reacted at 65-90° C. for 4-5 h. Then the prepolymer was transferred into a plastic jar, and TEA was added into plastic jar under high speed (2000-3000 rpm) stirring for 1-3 minutes. 186 g cold DI water (5° C.) was added into plastic jar under high speed stirring to make sure the homogeneous oil-in-water dispersion was achieved, and 7.8 g EDA water solution (20%) was added into the dispersion slowly, with stirring at 1000-1500 rpm for 15-30 minutes. PUD-2 was thus obtained with the Tg value of 5° C.

PUD-3
37 g Isonate™ 50 OP was added to the mixture of 33 g Bester™ 648, 21.6 g Voranol™ 1010 and 5.4 g Voranol™ PEG1000. Then the mixture reacted at 65-90° C. for 4-5 h.

Then the prepolymer was transferred into a plastic jar, and 12.5 g Rhodacal™ DS-4 was added into plastic jar under high speed (2000-3000 rpm) stirring for 1-3 minutes. 186 g cold DI water (5° C.) was added into plastic jar under high speed stirring to make sure the homogeneous oil-in-water dispersion was achieved, and 7.9 g EDA water solution (20%) was added into the dispersion slowly, with stirring at 1000-1500 rpm for 15-30 minutes. PUD-3 was thus obtained with the Tg value of −5° C.

PUD-4:

28 g Vestanat IPDI was added to the mixture of 35 g Capa 220, 35 g Voranol 2020 and 5 g Bis-MPA. Then the mixture reacted at 65-90° C. for 4-5 h. Then the prepolymer was transferred into a plastic jar, and TEA was added into plastic jar under high speed (2000-3000 rpm) stirring for 1-3 minutes. 186 g cold DI water (5° C.) was added into plastic jar under high speed stirring to make sure the homogeneous oil-in-water dispersion was achieved, and 3.8 g EDA water solution (20%) was added into the dispersion slowly, with stirring at 1000-1500 rpm for 15-30 minutes. PUD-4 was thus obtained with the Tg value of −55° C.

PUD-5:

26 g Vestanat IPDI was added to the mixture of 69 g Bester 121, and 5 g Bis-MPA. Then the mixture reacted at 65-90° C. for 4-5 h. Then the prepolymer was transferred into a plastic jar, and TEA was added into plastic jar under high speed (2000-3000 rpm) stirring for 1-3 minutes. 186 g cold DI water (5° C.) was added into plastic jar under high speed stirring to make sure the homogeneous oil-in-water dispersion was achieved, and 4.3 g EDA water solution (20%) was added into the dispersion slowly, with stirring at 1000-1500 rpm for 15-30 minutes. PUD-5 was thus obtained with the Tg value of −50° C.

Example 2: Preparation of Polyacrylic Emulsion ("PACs")

PAC-1

8.4 g RHODACAL™ DS-4 surfactant was dissolved in 426 grams deionized water. An emulsified monomer mixture was prepared by adding 28.3 grams glacial acrylic acid, 847.7 grams butyl acrylate, 536.9 grams styrene slowly to the agitated water/surfactant solution.

Next, 732 grams deionized water was added into a 5-necked, 5 liter round bottom flask equipped with a thermocouple, a cooling condenser, and an agitator. The water was heated to 86° C. under nitrogen. 3.1 grams of ammonium persulfate ("APS") initiator in 30 grams deionized water was charged into the flask, followed by 28 grams PRIMAL E-2086 and 10 grams deionized water. The emulsified monomer mixture was then fed into the flask in 215 minutes, meanwhile, a solution of APS (3.1 grams in 143 grams deionized water) was fed into the flask in 230 minutes. The temperature of the flask contents was maintained from about 85 to about 87° C. After completing the addition of the emulsified monomer mixture, the vessel that contained the emulsified monomer mixture and the feeding pipes leading into the flask were rinsed with 52 grams deionized water, and the rinse was added back to the flask. The temperature of the flask content was then held at about 86° C. for 30 minutes. Next, a solution of t-BHP (70%, 2.98 grams in 25 grams deionized water) and sodium formaldehyde sulfoxylate (1.71 grams in 28 grams deionized water) were fed to the flask over 45 minutes. The flask content was then cooled to room temperature before adding 16.35 grams of an ammonia solution over 30 minutes. Then 15.5 grams PPG 425 was added into the flask with 100 grams deionized water. Finally, the solid content of the obtained acrylic dispersion was diluted to 45% by deionized water. The PAC-1 has Tg value of 1° C.

PAC-2

The procedure for producing PAC-1 was repeated, except that 8.4 g RHODACAL™ DS-4 surfactant was dissolved in 426 grams deionized water; and an emulsified monomer mixture was prepared by adding 28.3 grams glacial acrylic acid, 734.7 grams butyl acrylate, 649.9 grams styrene slowly to the agitated water/surfactant solution. PAC-2 has Tg value of 12° C.

PAC-3

The procedure for producing PAC-1 was repeated, except that 8.4 g RHODACAL™ DS-4 surfactant was dissolved in 426 grams deionized water, and an emulsified monomer mixture was prepared by adding 28.3 grams glacial acrylic acid, 791.2 grams butyl acrylate, 593.4 grams styrene slowly to the agitated water/surfactant solution. PAC-3 has Tg value of 7° C.

Inventive Examples and Comparative Examples: Preparation of Adhesive Composition The PUD and the PAC listed in Table 1 below were mixed with a polyisocyanate component CR3A at 2% (based on the total weight of the adhesive composition) to form an adhesive composition.

TABLE 2

| | Formulation information | | | | | | | |
|---|---|---|---|---|---|---|---|---|
| | PUD-1 % | PUD-2 % | PUD-3 % | PUD-4 % | PUD-5 % | PAC-1 % | PAC-2 % | PAC-3 % |
| IE.1 | 30 | | | | | 70 | | |
| IE.2 | 20 | | | | | | 80 | |
| IE.3 | 30 | | | | | | | 70 |
| IE.4 | | 20 | | | | 80 | | |
| IE.5 | | | 30 | | | 70 | | |
| CE.1 | | | | | | 100 | | |
| CE.2 | | | | | | | 100 | |
| CE.3 | | | | | | | | 100 |
| CE.4 | 100 | | | | | | | |
| CE.5 | | | 100 | | | | | |
| CE.6 | | | | 30 | | 70 | | |
| CE.7 | | | | | 20 | | 80 | |
| CE.8 | 10 | | | | | | 90 | |

The above values referred to the parts by weight.

The above obtained adhesive composition was applied to the laminate of PET/MPET/PE50 for test. The results were listed in Table 3 below:

TABLE 3

Performance Evaluation Results for PET/MPET/PE50

| | Bond Strength (N/15 mm) out layer | Bond Strength (N/15 mm) inner layer | Heat Seal Strength (N/15 mm) | Zipper bag heat resistance @210° C. |
|---|---|---|---|---|
| IE.1 | 2.3 | 3.3 | 50 | Good |
| IE.2 | 2.3 | 2.9 | 46 | Good |
| IE.3 | 2.2 | 3.3 | 48 | Good |
| IE.4 | 2.2 | 3 | 46 | Good |
| IE.5 | 2.3 | 3.5 | 48 | Good |
| CE.1 | 2.5 | 3.5 | 53 | Fail with tunnel |
| CE.2 | 2.4 | 3.3 | 50 | Fail with tunnel |
| CE.3 | 2.5 | 4 | 56 | Fail with tunnel |
| CE.4 | 1.0 | 2 | 43 | Fail with tunnel |
| CE.5 | 1.8 | 2.1 | 30 | Fail with tunnel |
| CE.6 | 2.2 | 3 | 45 | Fail with tunnel |
| CE.7 | 2.6 | 3.2 | 52 | Fail with tunnel |
| CE8 | 2.5 | 3.4 | 50 | Fail with tunnel |

It can be seen from Table 3 that the inventive examples (IE.1-5) with both PUD and polyacrylate emulsion can have both good bond strength, heat seal strength and zipper bag heat resistance, whereas the comparative examples (CE. 1-7) showed neither poor performance nor poor zipper bag heat resistance.

Test Methods

Bond Strength (BS)

Laminates prepared with the adhesive compositions, a PET substrate and a PE50 substrate were cut into 15 mm width strips for T-peel test under 250 mm/min crosshead speed using a 5940 Series Single Column Table Top System available from Instron Corporation. During the test, the tail of each strip was pulled slightly by fingers to make sure the tail remained 90 degree to the peeling direction. Three strips for each sample were tested and the average value was calculated. Results were represented with the unit of N/15 mm. A higher value represents a better the bond strength.

Heat Seal Strength (HS)

Laminates prepared with the adhesive compositions, a PET substrate and a PE50 substrate were heat-sealed in a HSG-C Heat-Sealing Machine available from Brugger Company under 140° C. seal temperature and 300N pressure for 1 second, then cooled down and cut into 15 mm width strips for heat seal strength test under 250 mm/min crosshead speed using a 5940 Series Single Column Table Top System available from Instron Corporation. Three strips for each sample were tested and the average value was calculated. Results were represented with the unit of N/15 mm. A higher value represents a better heat seal strength.

Glass Transition Temperature (Tg)

Dry sample of PUD or PAC was put into Aluminum crucible, and then the sample was tested by DSC Q2000 from TA Instruments on this program:

1. Rise temperature from −80° C. to 120° C. by 20° C./min to erase thermal history;
2. Cool down to −80° C.;
3. Rise temperature from −80° C. to 120° C. by 10° C./min.

The half height point of transition was decided as glass transition temperature (Tg).

What is claimed is:

1. An adhesive composition for zipper bag application, comprising the following components:
    (a) a mixture of a polyurethane dispersion with an acrylic emulsion,
    wherein the polyurethane dispersion comprises a reaction product of by dry weight based on total dry weight of the polyurethane dispersion, from 30% to 50% of a monomeric diisocyanate, from 45% to 69% of a polymeric polyol and from 1% to 15% of an ionic surfactant, the polyurethane dispersion has a Tg of −15° C. to 15° C., and
    the acrylic emulsion has a Tg of −10° C. to 25° C. and comprises a polymer of unsaturated acrylic monomers selected from the group consisting of styrene, (meth) acrylic acid, lauryl methacrylate, iso-butyl acrylate, ethylhexyl acrylate, butyl acrylate, and combinations thereof, and wherein a ratio by weight of the polyurethane dispersion and the acrylic emulsion is from 15:85 to 85:15; and
    (b) a polyisocyanate.

2. The adhesive composition of claim 1, wherein the polyisocyanate is water dispersible aliphatic polyisocyanate.

3. The adhesive composition of claim 2, wherein the water dispersible aliphatic polyisocyanate comprises trimers of monomeric aliphatic diisocyanates selected from the group consisting of 1,6-hexamethylene diisocyanate, 1-isocyanato-3-isocyanatomethyl-3,5,5-trimethyl-cyclohexane, 4,4'-diisocyanato dicyclohexylmethane, di-isocyanatomethyl-cyclohexane, and combinations thereof.

4. The adhesive composition of claim 1, wherein a content of the polyisocyanate is from 1% to 10% based on a total weight of the mixture of polyurethane with the acrylic emulsion.

5. The adhesive composition of claim 1, wherein the acrylic emulsion comprises by dry weight based total dry weight of the acrylic emulsion, the polymer consisting of from 50% to 70% of butyl acrylate, from 35% to 50% of styrene and from 1% to 5% of acrylic acid.

6. The adhesive composition of claim 1, wherein the ratio by weight of the polyurethane dispersion and the acrylic emulsion is from 15:85 to 45:55.

7. A method of producing the zipper bag, comprising:
    (a) providing a film substrate;
    (b) providing an adhesive composition according to claim 1;
    (c) applying the adhesive composition to the substrate to form a laminate;
    (d) curing the laminate; and
    (e) making a pouch bag with the laminate and inserting a zipper to form zipper bag.

8. A zipper bag prepared by the method of claim 7.

9. The adhesive composition of claim 1 wherein the polymer is substantially free of amino-containing monomers.

* * * * *